No. 782,063. PATENTED FEB. 7, 1905.
G. C. SCOTT.
POULTRY HOUSE.
APPLICATION FILED FEB. 15, 1904.

2 SHEETS—SHEET 2.

WITNESSES:
H. B. Bradshaw
A. L. Phelps

INVENTOR
Gerard C. Scott
BY
Shepherd & Parker
ATTORNEYS.

No. 782,063.          Patented February 7, 1905.

UNITED STATES PATENT OFFICE.

REISSUED

GERARD C. SCOTT, OF COLUMBUS, OHIO.

POULTRY-HOUSE.

SPECIFICATION forming part of Letters Patent No. 782,063, dated February 7, 1905.

Application filed February 15, 1904. Serial No. 193,482.

*To all whom it may concern:*

Be it known that I, GERARD C. SCOTT, a citizen of the United States, residing at Columbus, in the county of Franklin and State of Ohio, have invented a certain new and useful Improvement in Poultry-Houses, of which the following is a specification.

My invention relates to the improvement of poultry-houses of that class which are adapted for raising and fattening poultry for the market; and the objects of my invention are to provide an improved poultry-house construction of this class which may be easily maintained in a sanitary condition and which is so constructed as to provide a compact arrangement of poultry-containing compartments adapted to house for fattening purposes a large number of fowls. These objects I accomplish in the manner illustrated in the accompanying drawings, in which—

Figure 1:
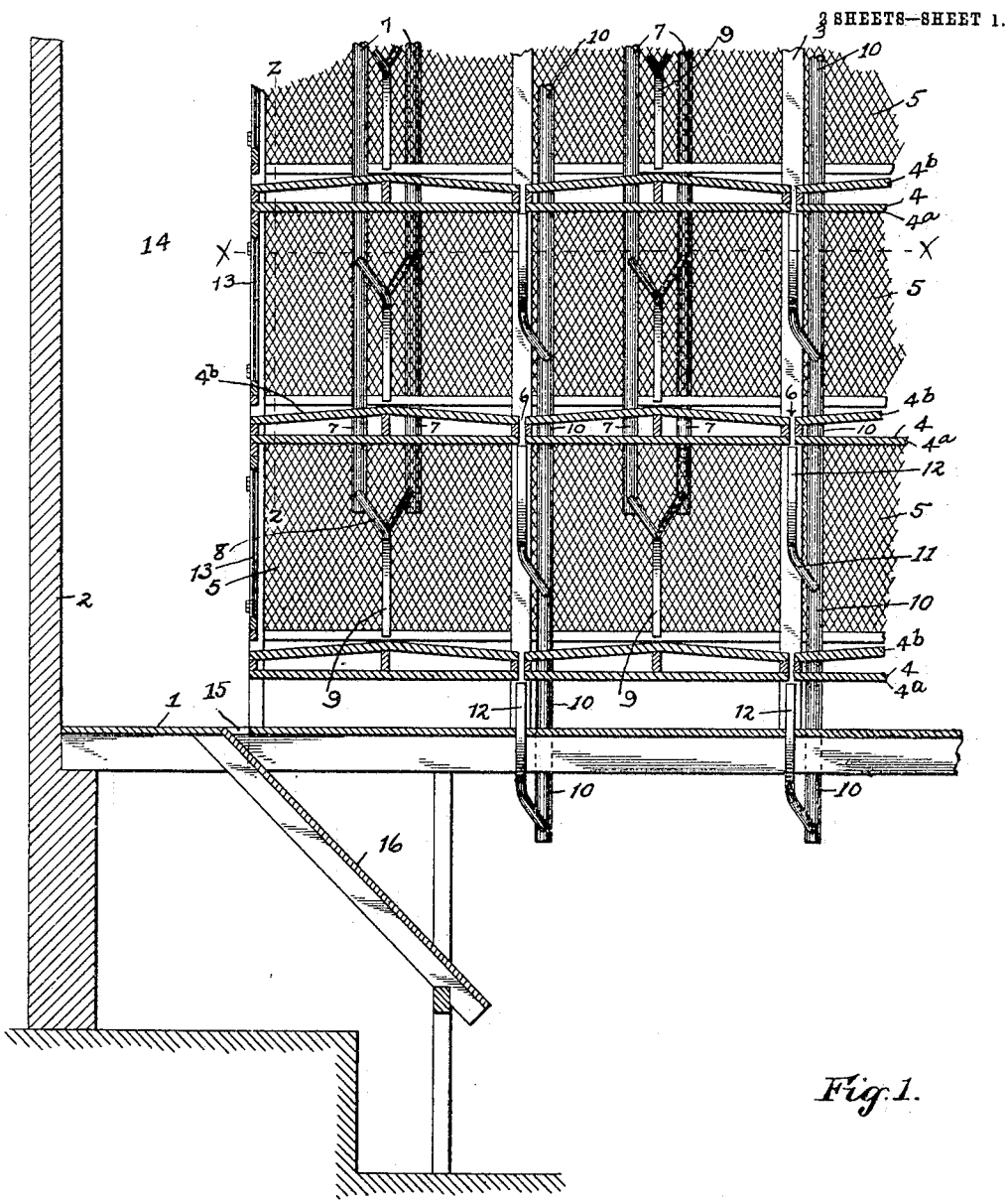
Figure 2:
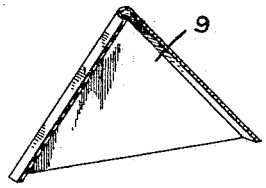
Figure 3:
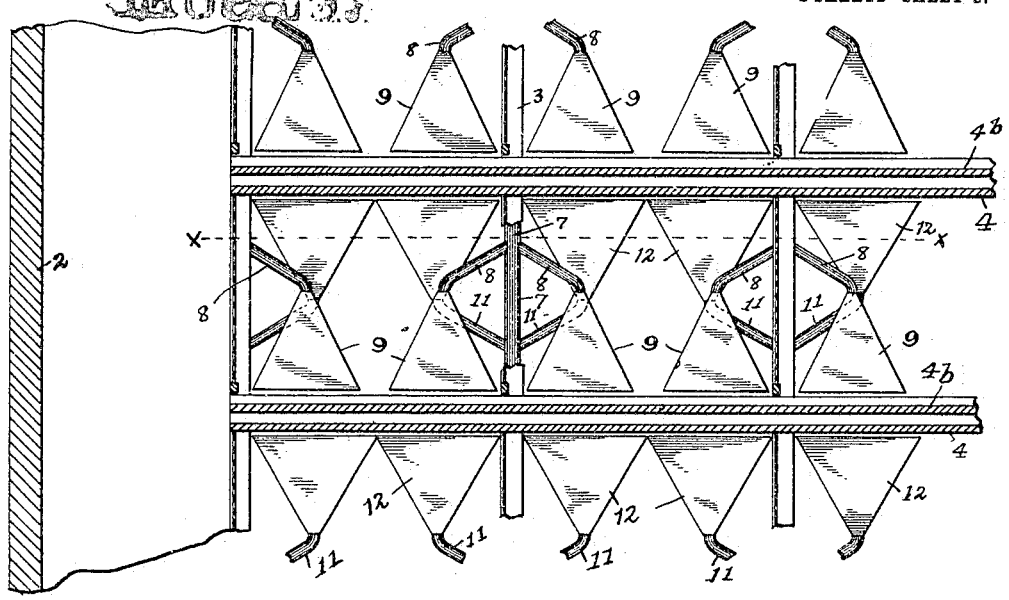
Figure 4:
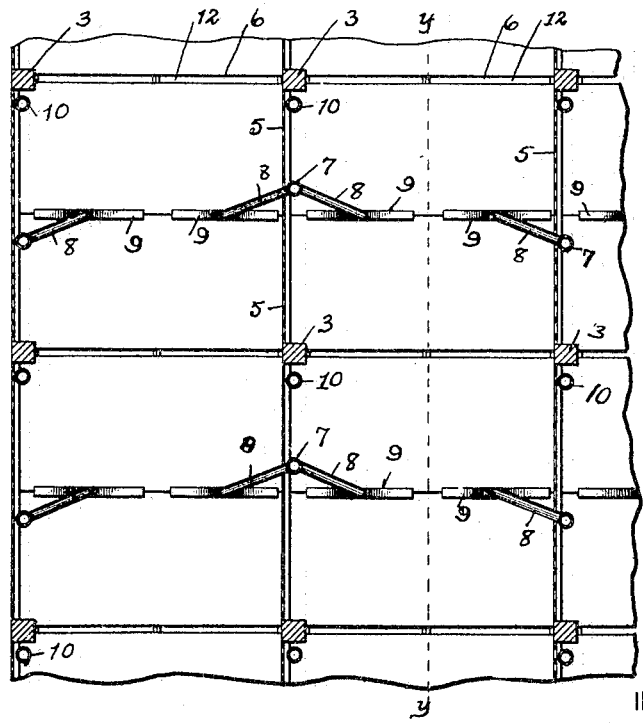

Figure 1 is a sectional view through three tiers of compartments, taken on line $y\ y$ of Fig. 2; and Fig. 2 is a front elevation of the compartment shown in Fig. 1, the lower compartment being for the sake of clearness in illustration broken away to the dotted line $x\ x$ of Fig. 1.

Similar numerals refer to similar parts throughout the several views.

My improved poultry-containing structure is preferably located within a suitable building, of which 1 represents one of the vertical walls thereof, and 2 the floor. Supported at a suitable point within said building and preferably extending throughout the length or greater portion of the length of the building is a comparatively narrow vertical bin or reservoir 3, the upper open end of which may have fed therein in any suitable manner material hereinafter specified. This longitudinally-arranged bin 3 has supported from the opposite faces thereof at intervals one above the other housings or inclosures which extend throughout the length or the greater portion of the length of the bin. Each of these housings or longitudinally-arranged inclosures comprises a horizontal floor portion 4, from the under side and outer portion of which depends suitable compartment-frames 5 of the next lower housing structure, which are preferably filled with parallel rods or bars 6, and these frames and rods, in conjunction with suitably-filled doorframes 7, form the fronts or outer portions of the compartments which are produced by interposing between said outer frame portions and the surfaces of the bin 3 transverse partition-frames 8, the latter being arranged at desirable intervals one from the other. These partition-frames are preferably filled with wire-netting, as indicated at 9, and extending across the bottoms of said compartments at intervals are parallel wires 10. I also provide a roosting-board or bar 11, which extends longitudinally through the lower portions of the compartments of each horizontal row. Extending across the fronts of the compartments and near the lower portion of each of the same is a feed-trough 12, from which the fowls contained in the compartments may obtain their food by the insertion of their heads between the bars or rods 6. Formed longitudinally in the walls of the vertical and central bin 3 are slotted openings 13, the latter communicating, as shown, with the spaces which are between the under sides of the compartments.

From the construction shown and described it will be seen that the compartment-forming structures, which are arranged on opposite sides of the bin 3, are so supported from said bin as to result in the separation of the under sides of one tier of compartments from its floor, the said floor forming the top of the next lower compartments, with the result that the droppings or refuse matter from the compartments will pass through the open-work floorings of the compartments and onto said floors or compartment-tops or into such material as may be discharged thereon from the central bin 3. This bin is intended to be kept constantly filled with a supply of suitable absorbent material, and it is obvious that while a certain amount of such material will by its passage through the slotted openings 13 accumulate upon the floors of the compartments the natural choking of the openings 13 by the accumulation of material about the entrances to the same will prevent a constant flow from the bin. This absorbent material which is thus discharged from the bin is permitted to cover the compartment-floor 4, where it may receive and absorb the refuse material above referred to. Owing to the fact that the spaces beneath the compartment structures are clear of obstruction, it is obvious that by the employment of a suitable device, such as a scraper operated manually or otherwise, the combined absorbent and refuse materials may be readily drawn outward and over the outer edges of the compartment-floors, thus permitting of the latter being retained in a comparatively clean or sanitary condition.

Having now fully described my invention, what I claim, and desire to secure by Letters Patent, is—

The combination with a bin having outlet-openings at intervals, of superposed floors supported from the sides of said bin, compartment-forming framework supported from the under side of each of said floors and separated from the next lower floor.

GERARD C. SCOTT.

In presence of—
C. C. SHEPHERD,
W. L. MORROW.